No. 610,316. Patented Sept. 6, 1898.
W. D. ARNETT.
SEEDING MACHINE.
(Application filed Feb. 21, 1898.)
(No Model.) 2 Sheets—Sheet I.
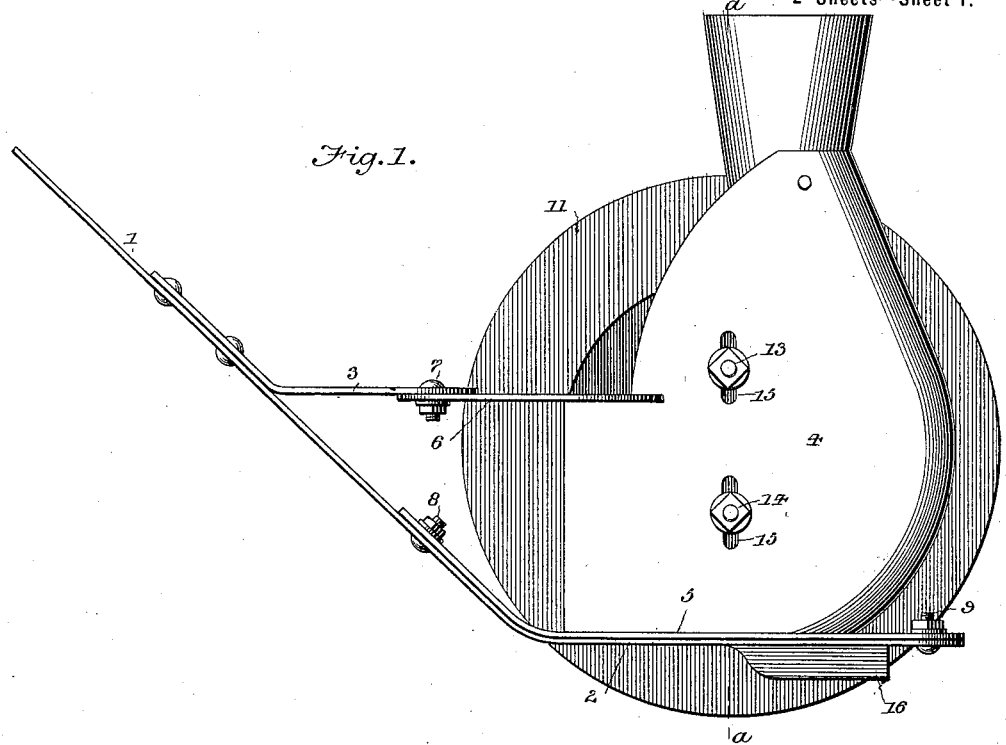
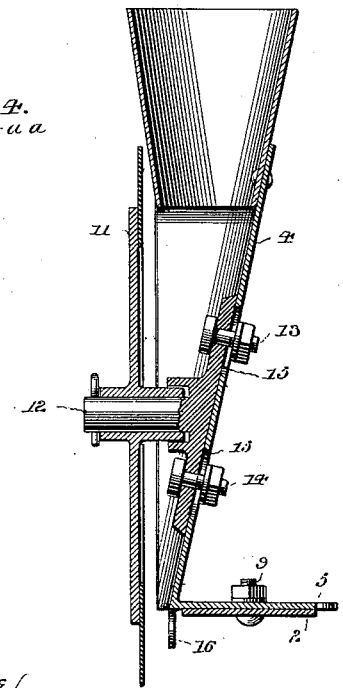
WITNESSES: INVENTOR No. 610,316. Patented Sept. 6, 1898.
W. D. ARNETT.
SEEDING MACHINE.
(Application filed Feb. 21, 1898.)

(No Model.) 2 Sheets—Sheet 2.

Witnesses
Arthur Ashley
G. S. Elmon

Inventor
W. D. Arnett
By P. Y. Dodge,
Attorney

UNITED STATES PATENT OFFICE.

WILLIAM D. ARNETT, OF SPRINGFIELD, OHIO.

SEEDING-MACHINE.

SPECIFICATION forming part of Letters Patent No. 610,316, dated September 6, 1898.

Application filed February 21, 1898. Serial No. 671,043. (No model.)

*To all whom it may concern:*

Be it known that I, WILLIAM D. ARNETT, of Springfield, county of Clark, and State of Ohio, have invented a new and useful Improvement in Seeding-Machines, of which the following is a specification.

This invention relates to that class of seeding-machines embodying a gang or series of furrow-opening disks with means for delivering the seed into the furrows formed by the disks; and the invention consists in an improved arrangement of the disks and devices for directing the seed into the furrow, having in view the dropping of the seed with certainty and precision, the variation of the depth and width of the furrow, and the reduction to the minimum of the draft required for operating the machine.

The invention also consists in the details of construction and combination of parts hereinafter described and claimed.

Figure 2:
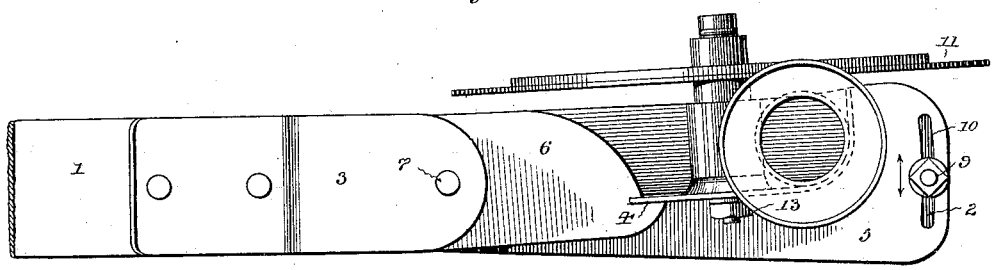
Figure 3:
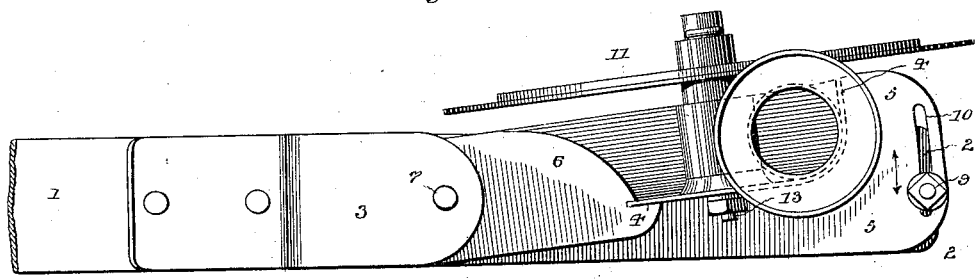

In the accompanying drawings, Figure 1 is a side elevation of one of the drag-bars and attached furrow-opening disk. Fig. 2 is a top plan view of the same. Fig. 3 is a similar view of the disk adjusted at an inclination to the line of draft. Fig. 4 is a vertical sectional elevation on the line $a\,a$ of Fig. 1.

Referring to the drawings, 1 represents one of a series of drag-bars, which in practice is pivoted, as usual, at its forward ends on a horizontal axis to move vertically. At the rear end the drag-bar extends horizontally, as at 2, in the form of a runner, and above this runner is a horizontal rearwardly-extending arm 3.

4 represents a shield in the form of a vertical plate, having attached to its lower edge a lateral horizontally-extending flange 5, which is seated on the horizontal runner 2, while above this flange the shield has fixed to it a forwardly-extending horizontal arm 6, bearing against the under side of the arm 3 and pivotally connected thereto by a vertical bolt 7. The flange 5 is extended beyond the shield at its forward end and is pivoted to the runner by a vertical bolt 8, this construction admitting of a horizontal pivotal movement of the shield with respect to the drag-bar, which movement may be controlled by means of an adjusting-bolt 9, extending through the rear end of the runner upward through a slot 10 in the rear end of the flange 5.

To the side of the shield opposite the flange 5 a furrow-opening disk 11 is journaled to a horizontal spindle 12, having fixed to its inner end a base-plate adjustably connected to the shield by means of adjusting-bolts 13 and 14, extending through the plate and through vertical slots 15 in the shield, this arrangement admitting of the vertical adjustment of the journal and its disk with respect to the shield. The furrow-opening disk is flat and extends some distance below the horizontal portion of the runner, the latter serving as a stop to insure a furrow of uniform depth.

From the lower edge of the shield a plate 16 depends a slight distance into the furrow, its front end terminating vertically in line with the axis of the disk, as shown in Fig. 1. This plate serves to prevent the stubble or soil after the furrow has been opened from caving in and interfering with the proper deposit of the seed. The disk and shield are arranged so that they converge toward the bottom, the seed being introduced between them at the top and the shield directing the seed with certainty into the furrow. The vertical adjustment of the disk with respect to the shield admits of the regulation of the depth of the furrow, while the horizontal adjustment of the shield with respect to the drag-bar regulates the width of the furrow by varying the inclination of the disk with respect to the line of draft.

By reason of the employment of the shield to insure the deposit of the seed directly into the furrow I am enabled to operate the machine with narrow furrows, thus reducing to a minimum the draft required to advance the machine.

Having thus described my invention, what I claim is—

1. In a seeding-machine the combination with a drag-bar of the horizontally-adjustable shield connected thereto and a furrow-opening disk journaled on said shield.

2. In a seeding-machine the combination with a drag-bar of a vertical shield pivoted thereto on a vertical axis, means for holding the shield fixedly with relation to the bar and a furrow-opening disk journaled on the shield.

3. In a seeding-machine the combination with a drag-bar of a shield connected thereto and a furrow-opening disk journaled on the shield and adjustable vertically.

4. In a seeding-machine the combination with a drag-bar of a horizontally-adjustable shield sustained thereby and a vertically-adjustable furrow-opening disk journaled on the shield.

5. In a seeding-machine the combination with a drag-bar of a vertical shield connected thereto and provided on its lower edge with a horizontal lateral flange and a furrow-opening disk journaled to said shield on the side opposite the flange.

6. In a seeding-machine the combination with a drag-bar of a vertical shield connected thereto and provided on its lower edge with a horizontal lateral flange, a furrow-opening disk journaled on the shield and a depending plate extending below the flange and adapted to project into the furrow.

7. In a seeding-machine the combination with a drag-bar provided with a horizontally-extending runner and with a rearwardly-extending arm above the runner, of a shield provided with a lateral flange on its lower edge bearing against the runner and a forwardly-extending arm bearing against the arm on the drag-bar, pivots connecting the flange and arm on the shield respectively with the runner and arm on the drag-bar, an adjusting-bolt connecting the runner with the flange in rear of the pivots and a furrow-opening disk journaled to the shield.

8. In a seeding-machine the combination with a drag-bar of a vertical shield connected thereto, a spindle provided with a base-plate applied to the shield, adjusting-bolts connecting the base-plate adjustably to the shield and a furrow-opening disk mounted on the spindle.

In testimony whereof I hereunto set my hand, this 31st day of January, 1898, in the presence of two attesting witnesses.

WILLIAM D. ARNETT.

Witnesses:
JOHN L. ZIMMERMAN,
JOHN W. SHOEMAKER.